United States Patent [19]

Eichholtz et al.

[11] Patent Number: 4,735,785

[45] Date of Patent: Apr. 5, 1988

[54] METHOD OF REMOVING OXIDES OF NITROGEN FROM FLUE GAS

[75] Inventors: Hans A. Eichholtz, Recklinghausen; Helmut A. Weiler, Velbert, both of Fed. Rep. of Germany

[73] Assignee: Steag Aktiengesellschaft, Fed. Rep. of Germany

[21] Appl. No.: 11,296

[22] Filed: Feb. 5, 1987

[30] Foreign Application Priority Data

Feb. 8, 1986 [DE] Fed. Rep. of Germany ....... 3604045
Jul. 7, 1986 [EP] European Pat. Off. ......... 86109266.6

[51] Int. Cl.$^4$ .......................... B01J 8/00; C01B 21/00
[52] U.S. Cl. .................................... 423/239; 423/235
[58] Field of Search ................... 423/235, 235 D, 239, 423/239 A

[56] References Cited

U.S. PATENT DOCUMENTS 4,302,205 11/1981 Muraki et al. ...................... 423/235
4,314,345 2/1982 Shiraishi et al. ..................... 423/235
4,469,662 9/1984 Hamada et al. ...................... 423/235
4,473,535 9/1984 Kittrell et al. ........................ 423/239
4,473,537 9/1984 Ford et al. ........................... 423/235

*Primary Examiner*—Gregory A. Heller
*Attorney, Agent, or Firm*—Blakely, Sokoloff, Taylor & Zafman

[57] ABSTRACT

A flue gas stream having passed a flue gas desulfurization plant 2 enters a reactor 6 flowing through an activated carbon bed. The flue gas entering the reactor continuously is discontinuously blended with ammonia, thereby achieving a low ammonia content of the flue gas leaving the reactor, while maintaining a high efficiency of nitrogen oxide removal. The duration of ammonia addition and the rate of flow at which ammonia is added to the flue gas stream are controlled as a function of the desired efficiency of nitrogen oxide removal and the ammonia concentration measured in the reactor.

16 Claims, 1 Drawing Sheet

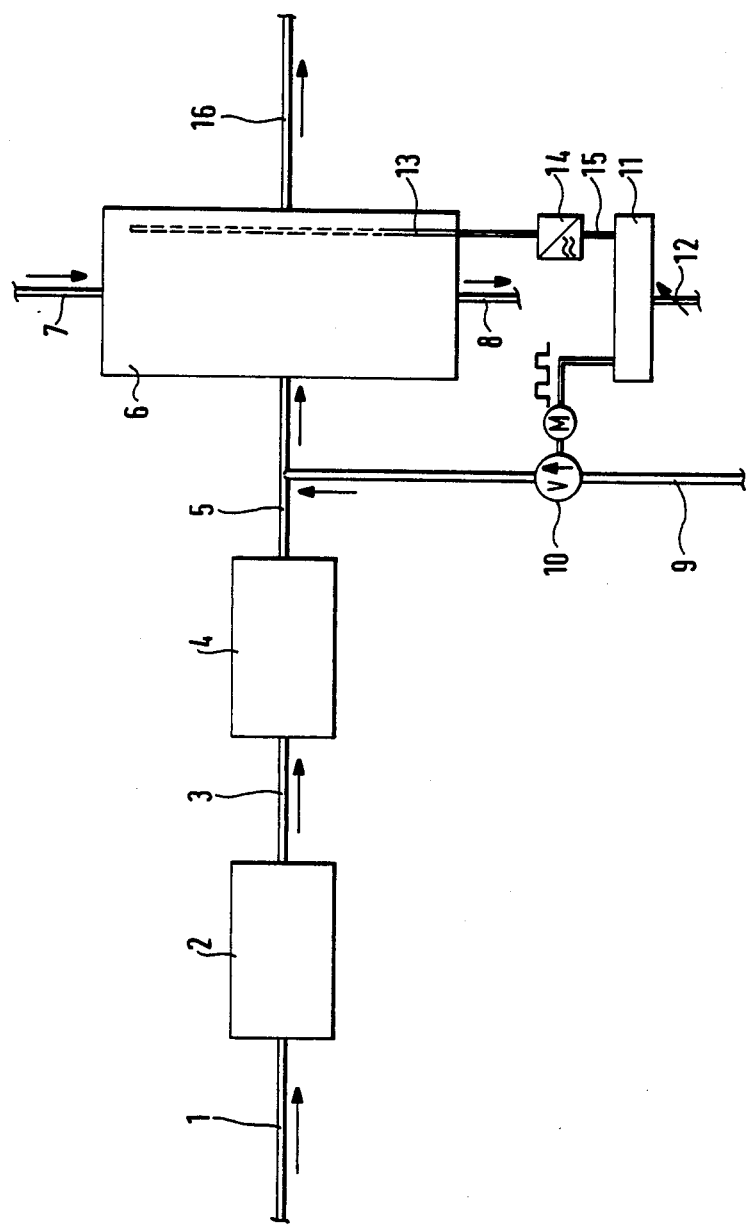

4,735,785

METHOD OF REMOVING OXIDES OF NITROGEN FROM FLUE GAS

BACKGROUND OF THE INVENTION

1. Field of the Invention

The present invention concerns the removal of oxides of nitrogen (herein referred to as "$NO_x$") from flue gases and, more particularly, the removal of $NO_x$ from a continuous stream of flue gas by reacting said flue gas in a bed, a layer or a structure of adsorption means having catalytic effects with ammonia (herein referred to as "$NH_3$") as a reducing agent.

2. Prior Art

West German patent application No. 2 911 712 divulges a two-stage method of pollutant removal providing for a first-stage moving bed for the removal of a substantial part of oxides of sulfur contained in flue gas and a second-stage moving bed containing a granular carbon-containing adsorption agent for the catalytic reduction of $NO_x$ to molecular nitrogen following the controlled addition of gaseous $NH_3$ and for the removal of further oxides of sulfur by a method of the nature mentioned hereinabove. However, if activated carbon is used as a catalyst for such a method of $NO_x$ control using $NH_3$ as a reducing agent, large quantities of $NH_3$ must always be present on and retained by the surfaces of said activated carbon, thereby necessitating a high $NH_3$ partial pressure implying a high $NH_3$ concentration in said flue gas exceeding the stoichiometric concentration necessary for the conversion of the $NO_x$ contained in said flue gas. As soon as the $NH_3$ concentration exceeds the activated carbon equilibrium load, substantial quantities of $NH_3$ will therefore pass through said activated carbon and will be contained in the flue gas downstream of said activated carbon bed.

All known methods of the nature described provide for a continuous addition of the reducing $NH_3$ to such flue gas upstream of said activated carbon bed at a rate depending upon the desired $NO_x$ removal efficiency. If conventional methods are used, a high $NH_3$ content of the flue gas downstream of said activated carbon bed is inevitable, if a high $NO_x$ removal efficiency such as the removal of more than 70% of the $NO_x$ originally contained in such flue gas is desired.

According to the state of the art hitherto known, if both oxides of sulfur and $NO_x$ are removed from flue gas, excess ammonia is retained in a separate unit through which activated carbon from the sulfur dioxide removal unit is continuously cycled. Said activated carbon is loaded with acidic compounds from said sulfur dioxide removal unit and thence substantially decreases the $NH_3$ content of said flue gas. However, if activated carbon is exclusively used for $NO_x$ control, the quantity of activated carbon loaded with acidic compounds is insufficient for effective $NH_3$ control.

SUMMARY OF THE INVENTION

It is an object of the present invention to eliminate the disadvantages associated with conventional methods of $NO_x$ removal as described hereinabove and to minimize at reasonable expense the $NH_3$ concentration downstream of a reactor containing adsorption means even if the $NO_x$ removal efficiency is high and, more particularly, in excess of 70%.

According to the teachings of the present invention concerning a method of removing $NO_x$ from a continuous stream of flue gas, said flue gas preferably having passed a flue gas desulfurization plant is blended with $NH_3$ and thereupon flows through at least one bed or one structure consisting of adsorption means having catalytic effects, $NH_3$ blending with said flue gas which flows continuously being discontinuous. Said discontinuous blending operation consists of a cycle of two phases, the rate at which $NH_3$ is added to said flue gas changing substantially as a first phase of said cycle is followed by a second phase and said second phase is followed by a new first phase. Whilst, according to the present invention, the rate at which $NH_3$ is so added is relatively high during each such first phase, it is relatively low or even zero during each such second phase.

The present invention teaches therefore that reducing $NH_3$ is not added continuously to the flue gas to be treated as has hitherto been conventional practice, but is blended discontinuously with said flue gas being emitted continuously prior to the entry of said flue gas into the reactor containing adsorption means, said discontinuous blending operation being part of a regular cycle comprising two phases as described hereinbefore. During the $NH_3$ blending phase of each such sycle, the rate at which $NH_3$ is added to said flue gas may be higher than in the case of conventional continuous $NH_3$ blending techniques, thereby allowing an increase in both the $NO_x$ removal efficiency and the $NH_3$ load of said adsorption means which may be activated carbon over the $NO_x$ removal efficiency and the $NH_3$ load in conventional processes, whilst said relatively high rate of $NH_3$ addition does not result in an excessive $NH_3$ concentration of said flue gas downstream of said adsorption means.

The duration of each such phase of ammonia addition and the rate at which ammonia is so added to said flue gas are determined by the desired $NO_x$ removal efficiency as well as by the $NH_3$ concentration measured at an appropriate point in the bed of said adsorption means inside the reactor containing said adsorption means.

According to a further aspect of the present invention, the $NO_x$ concentration is thence measured in a downstream part, in the direction of flue gas flow, of the reactor containing said adsorption means and the rate at which $NH_3$ is added to said flue gas and/or the duration of each $NH_3$ addition phase are controlled as a function of the $NH_3$ concentration so measured. The desired $NO_x$ removal efficiency may be inputted, as a setpoint, into a device for the control of the rate and/or the duration of $NH_3$ addition.

It is apparent that it is also possible to control the rate of $NH_3$ addition or the duration of each $NH_3$ addition phase as a function of the $NH_3$ concentration measured as described hereinabove and to preset the other variable not so controlled in accordance with the desired $NO_x$ removal efficiency.

During each phase of $NH_3$ addition to the flue gas to be treated at a high rate, said $NH_3$ rate should at least be twice as high as during the second phase of the cycle of $NH_3$ addition. In view of the relatively long duration of flue gas treatment by the method proposed by the present invention, the speed of the transition from a relatively high rate of $NH_3$ addition to a relatively low or a zero rate of $NH_3$ addition and from a relatively low or a zero rate of $NH_3$ addition to a relatively high rate of $NH_3$ addition is, for the purposes of the present invention, not a critical factor, allowing the use of relatively slow actuators and control systems.

The duration of each phase of NH3 addition to the flue gas to be treated at a high rate is preferably shorter or not longer than the duration of each phase of low or no NH3 addition. The ratio of the durations of said two phases may be set between 1:60 and 1:1.

The method proposed by the present invention allows the use of a fixed bed or a moving bed consisting of a granular carbon-containing adsorption means.

The advantages of a discontinuous addition of NH3 to a flue gas to be treated as described herein may be achieved using any adsorption means having catalytic effects, if said adsorption means retains substantial quantities of the components involved in the $NO_x$ removal reaction (NH3, $NO_x$ and oxygen) by its relatively large surface. Apart from a granular carbon-containing adsorption means as mentioned hereinabove, zeolite catalysts proposed for selective adsorption for the removal of $NO_x$ from flue gas for example by U.S. Pat. No. 4,046,888 and a paper published in *Energie*, 37th year, No. 6, June 1985, may for instance be used for the application of the method proposed by the present invention. Further, molecular sieve catalysts have become increasingly important for the selective catalytic reduction of $NO_x$ which is the field of the present invention. The advantages of such molecular sieve catalysts include high space velocities, high reduction efficiencies and high resistance to mechanical wear. The high selectivity of molecular sieves attributable to the defined pore sizes of their lattice structures is another advantage of such molecular sieves the catalytic effect whereof is, as is generally known, explained by their crystal lattice structures. According to another aspect of the present invention, a molecular sieve is used for the reaction whereby $NO_x$ is removed from a flue gas.

BRIEF DESCRIPTION OF THE DRAWING

The present invention will now be described with the help of a preferred embodiment illustrated by the accompanying drawing designated by FIG. 1. Said FIG. 1 is a block diagram of said preferred embodiment.

DETAILED DESCRIPTION OF THE DRAWING

In the accompanying drawing, flue gas flows through a flue gas duct 1 to a flue gas desulfurization plant 2 where it is desulfurized and from where the flue gas so desulfurized passes through a second flue gas duct 3 to a heat exchanger means 4 wherein the temperature of said flue gas is raised to the temperature of reaction in a downstream reactor 6 connected with said heat exchanger means 4 by a third flue gas duct 5. Said reactor 6 contains a fixed bed or a moving bed of granular carbon-containing adsorption means and preferably activated carbon. If said bed is a moving bed, said adsorption means enters said reactor 6 through a top entry 7 and is discharged from said reactor 6 through a bottom outlet 8.

Ammonia (NH3) supplied through an NH3 line 9 is blended with said flue gas in flue gas 5 at an NH3 rate of flow controlled by valve means 10. Said valve means 10 is alternately opened and closed by a controlling device 12, NH3 addition to said flue gas flowing continuously through said duct 5 thereby being a discontinuous operation. In the embodiment of the present invention illustrated by FIG. 1 said controlling device 11 is a computer such as a microcomputer controlling the length of each phase of NH3 addition to said flue gas and the quantity of NH3 added to said flue gas during each such phase in response to a setpoint $NO_x$ removal efficiency inputted manually into said controlling device 11 via interface 12 and in response to the NH3 concentration obtained from an NH3 partial pressure pick-up device 13 inside reactor 6, said partial pressure pick-up device being arranged at an appropriate point in the downstream part of the bed in said reactor 6. The values measured by said pick-up device 13 are converted by a transducer means 14, which may be coupled with an analog-to-digital converter, into electrical signals proportionate to said measured values and transmitted by line 15 to said controlling device 11 for control action.

It may for instrumentation reasons be useful not to measure the NH3 concentration but the $NO_x$ concentration (expressed as $NO_2$) at the point of pick-up 13 or downstream of reactor 6 and to provide for the control of the discontinuous addition of NH3 to the flue gas to be treated by the technique the principles whereof have been described hereinabove.

As NH3 is added discontinuously to the flue gas to be treated in flue gas duct 5, the NH3 content of the flue gas leaving said reactor 6 through a further flue gas duct 16 is very low even if the efficiency of $NO_x$ removal is very high and exceeds 70%.

Typical data illustrating, by way of example, the application of the method proposed by the present invention are summarized in Table 1 below.

TABLE 1

| Typical Data | |
|---|---|
| Rate of untreated flue gas flow | 1,000,000 m³/hr. (normal conditions, dry) |
| $NO_x$ content of untreated flue gas | 1,000 mg/m³ (normal conditions, dry), expressed as $NO_2$ |
| $SO_2$ content of untreated flue gas | 0 mg/m³ (normal conditions, dry) |
| $NO_x$ content of treated flue gas | 200 mg/m³ (normal conditions dry), expressed as $NO_2$ |
| NH3 content of treated flue gas | 35 mg/m³ (normal conditions, dry) |
| NH3 consumption | 330.6 kg/hr. |
| 1. Example 1 | |
| Total cycle length | 60 min. |
| Length of phase 1 | 5 min. |
| NH3 quantity added in phase 1 | 330.6 kg |
| Length of phase 2 | 55 min. |
| NH3 quantity added in phase 2 | 0 kg |
| Phase 1 to phase 2 NH3 ratio | 330.6:0 = ∞ |
| 2. Example 2 | |
| Total cycle length | 30 min. |
| Length of phase 1 | 5 min. |
| NH3 quantity added in phase 1 | 110.2 kg |
| Length of phase 2 | 25 min. |
| NH3 quantity added in phase 2 | 55.1 kg |
| Phase 1 to phase 2 NH3 ratio | 110.2:55.1 = 2 |

Any person versed in the art will appreciate that the present invention is not limited to the aspects, embodiments and examples described hereinabove and that numerous other aspects and embodiments and a large variety of modifications and variations are within the scope of the novel method of $NO_x$ removal divulged herein. Said novel method is more particularly not restricted to the use of pure ammonia as a reducing agent and a number of substances from which ammonia may be obtained, such as aqueous ammonia solution, ammonia carbonate, aqueous ammonia carbonate solution or urea or the like solutions of ammonia carbonate, may be used for the application of the method proposed by the present invention, such substances producing ammonia when they evaporate.

We claim:

1. A method of removing oxides of nitrogen from a continuous flue gas stream, said method comprising the steps of:

providing a reactor with an adsorbent discontinuously adding ammonia as a reducing agent to said continuous flue gas stream, said discontinuous additions of ammonia to said flue gas stream comprising alternating first and second phases at different rates of ammonia addition, the rate of said ammonia addition, during each said first phase and being reduced to, at most, half the rate of ammonia addition during the immediately preceding second phase;

passing said continuous flue gas stream through said adsorbent in said reactor thereby causing said oxides of nitrogen to react with said ammonia in the presence of said adsorbent which acts as a catalyst; and discharging the flue gas so treated from said reactor.

2. A method according to claim 1 further comprising the steps of passing said continuous flue gas stream in a main direction of flow through a bed of said adsorbent in said reactor, measuring the ammonia concentration in the downstream part of said bed of said adsorbent and controlling at least one of the variables of the rate of ammonia addition and the duration of ammonia addition as a function of the ammonia concentration so measured.

3. A method according to claim 2 wherein a setpoint of the efficiency of nitrogen oxide removal is determined and is inputted into a controlling device for the control of at least one of the variables of the rate of ammonia addition and the duration of ammonia addition.

4. A method according to claim 2 wherein said rate of ammonia addition is controlled as a function of the ammonia concentration so measured and said duration of ammonia addition is preset as a function of a setpoint efficiency of nitrogen oxide removal.

5. A method according to claim 2 wherein said duration of ammonia addition is controlled as a function of the ammonia concentration so measured and said rate of ammonia addition is preset as a function of a setpoint efficiency of nitrogen oxide removal.

6. A method according to claim 1 wherein the rate of said ammonia addition during each such first phase is set to at least twice as large a rate as during each such second phase.

7. A method according to claim 6 wherein the duration of each such first phase is set to at most the same length as the duration of each such second phase.

8. A method according to claim 1 wherein said reaction between said oxides of nitrogen and said ammonia is a reaction in a fixed activated carbon bed.

9. A method according to claim 1 wherein said reaction between said oxides of nitrogen and said ammonia is a reaction in a moving activated carbon bed.

10. A method according to claim 1 wherein said adsorbent has catalytic effects and is a molecular sieve.

11. A method of removing oxides of nitrogen from flue gas in a reactor with an adsorbent, said method comprising the steps of:

discontinuously adding ammonia as a reducing agent at at least one point upstream of said reactor to a continuous flue of said flue gas from which said oxides of nitrogen are to be removed, said discontinuous addition of ammonia comprising alternating first and second phases at different rates of ammonia addition, comprising regular cycles having first and second phases such that during said first phase of each such cycle a substantial quantity of ammonia is so added, and during said second phase of each such cycle substantially no ammonia is so added;

passing said continuous flue gas stream in at least one direction of flow through said reactor containing said adsorbent; and discharging the flue gas from which said oxides of nitrogen have been so removed from said reactor.

12. A method according to claim 11 further comprising the steps of measuring the ammonia concentration in the downstream part of said reactor containing said adsorbent and controlling at least one of the variables of the rate of said ammonia addition and the duration of each such ammonia addition as a funcion of the ammonia concentration so measured.

13. A method according to claim 12 wherein a setpoint of the efficiency of nitrogen oxide removal is determined and is inputted into a controlling device for the control of at least one of the variables of the rate of ammonia addition and the duration of ammonia addition.

14. A method according to claim 12 wherein said rate of ammonia addition is controlled as a function of the ammonia concentration so measured and said duration of ammonia addition is preset as a function of a setpoint efficiency of nitrogen oxide removal.

15. A method according to claim 12 wherein each such duration of ammonia addition is controlled as a function of the ammonia concentration so measured and said rate of ammonia addition is preset as a function of a setpoint efficiency of nitrogen oxide removal.

16. A method according to claim 12 wherein the duration of each such first phase is set to at most the same length as the duration of each such second phase.

* * * * *